(12) United States Patent  
Biskeborn

(10) Patent No.: US 7,474,498 B2
(45) Date of Patent: Jan. 6, 2009

(54) TAPE RECORDING SYSTEM

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/957,662

(22) Filed: Dec. 17, 2007

(65) Prior Publication Data

US 2008/0088967 A1    Apr. 17, 2008

Related U.S. Application Data

(63) Continuation of application No. 11/062,275, filed on Feb. 17, 2005, now Pat. No. 7,339,874.

(51) Int. Cl.
*G11B 15/00* (2006.01)
(52) U.S. Cl. ....................................................... 360/95
(58) Field of Classification Search .................. None
See application file for complete search history.

(56) References Cited

U.S. PATENT DOCUMENTS

| | | | |
|---|---|---|---|
| 3,587,997 A | 6/1971 | Wood et al. |
| 3,913,144 A | 10/1975 | Yagi et al. |
| 3,938,752 A | 2/1976 | Mann et al. |
| 4,122,504 A | 10/1978 | Prozzo et al. |

*Primary Examiner*—Mark Blouin
(74) *Attorney, Agent, or Firm*—Jeffrey P. Aiello

(57) ABSTRACT

A tape recording system is provided for coupling the angular velocities of a pair of roller guides disposed one on either side of a head assembly. In one embodiment, the roller guides each comprise cylindrical first and second surfaces wherein the first surfaces guide a tape over the head assembly. An idler bearing comprising a cylindrical ring having an inside diameter surface engages in rolling contact the second surfaces of the pair of roller guides, thereby coupling the angular velocities of the pair of roller guides. In another embodiment, an idler bearing comprises a roller having an outside diameter surface that engages the surfaces of a pair of roller guides on each side of the head to couple the angular velocities of the pair of roller guides.

16 Claims, 6 Drawing Sheets

FIG. 2b  SECTION A-A

TAPE RECORDING SYSTEM

CROSS-REFERENCE TO RELATED APPLICATION

This application is a continuation of application Ser. No. 11/062,275 filed on Feb. 17, 2005, which is incorporated herein by reference in its entirety.

BACKGROUND OF THE INVENTION

1. Field of the Invention

The invention relates to the field of recording tape transport mechanisms and more particularly to a tape recording system having a mechanism to couple the rotation of roller guides adjacent to a tape head assembly.

2. Background Information

Magnetic tape storage systems are widely used in computer systems for storing and retrieving large amounts of data. Current systems typically read and write from parallel tracks on the tape which vary in number based on the design of the system. Each track of the head has a read and a write magnetic transducer (head) arranged in tandem so that the data written by the write head can be verified by the read head. The head pairs may be alternated so that one set of the tracks are written and read when the tape travels in one direction and the other set is used when the tape is moving in the opposite direction.

Some tapes are written with magnetic servo information thereon to allow positioning of the heads in relation to the tracks. All tapes have a magnetic noise floor which is present even when the tape is erased. Therefore, even a tape with no data recorded thereon will generate a media noise signal in the read heads and tapes with servo information will also generate signals corresponding to servo information.

For high density recording the tape must be precisely positioned and tensioned as it moves across the head assembly. The tape is typically supported and positioned by support surfaces, for example cylindrical rollers or posts or guides disposed on each side of the head. The support surfaces may be positioned to form the wrap angles which are the angles of the plane of the tape with respect to the air bearing surfaces of the head. Precise wrap angles are necessary for optimum performance.

Therefore, there is an ongoing need for improved tape support and positioning systems to reduce damage to the recording tape and to provide precise stability and tracking of the tape relative to the recording head during operation.

SUMMARY OF THE INVENTION

A tape recorder drive system comprising a head assembly, a pair of roller guides disposed one on each side of the head assembly, the roller guides each comprising first and second surfaces, wherein the first surfaces support a tape while the tape is moving across the head assembly, and an idler bearing comprising a cylindrical ring having an inside diameter surface, the inside diameter surface engaging in rolling contact the second surfaces of the pair of roller guides.

In another embodiment, a tape recording system comprises a head assembly, a pair of roller guides disposed one on each side of the head assembly. The roller guides each comprising a cylindrical surface for supporting a tape moving across the head assembly, and an idler bearing comprising a roller having an outside diameter surface. The outside diameter surface simultaneously engaging in rolling contact the cylindrical surfaces of the roller guides on each side of the head.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings:

FIG. 2b is a cross-sectional view, not to scale, at section A-A of the rollers in the tape drive shown in FIG. 2a;

DESCRIPTION OF THE PREFERRED EMBODIMENTS

Figure 1:
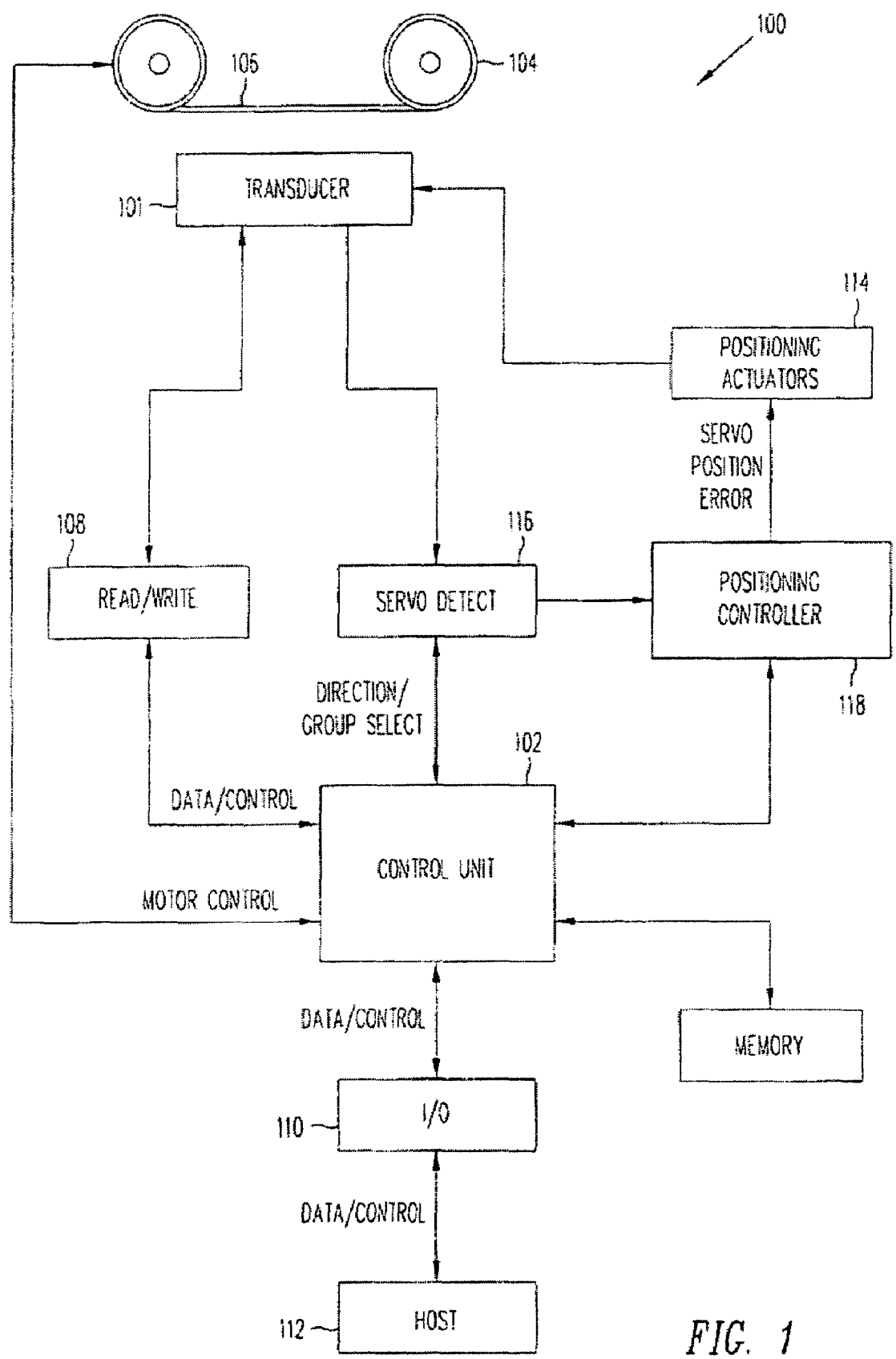
FIG. 1 is a simplified diagram of a magnetic tape recorder system using the coupled rollers of the present invention.

FIG. 1 illustrates an embodiment of a magnetic tape recorder or tape drive system 100 incorporating the coupling idler bearing for paired rollers of the present invention. A tape drive control unit 102 provides a motor control signal to rotate tape reels 104 and move magnetic tape 106 across the read/write transducer head 101. Read/write channel 108 transmits read/write signals between the read/write transducer 101 and the control unit 102. The data is communicated through I/O channel 110 with host 112. Lateral positioning of the transducer 101 with respect to the tape 106 is accomplished by coarse and fine positioning actuators 114. The lateral repositioning by a coarse actuator is required to access the various tracks of the tape 106 with the transducer 101. A servo system and fine actuator may be employed for accurate lateral repositioning of the transducer 102. An exemplary servo system includes a servo detector 116 to detect both the track that the head is currently on and whether the head is off center. Control unit 102. indicates the track address of a desired new track to positioning controller 118 for repositioning the head. Servo detector 116 indicates the current track to positioning controller 118, and the controller provides a servo position correction signal to the coarse actuator of positioning actuators 114 which repositions the transducer 101 to the new track. The servo system also provides track following signals to the fine actuator of positioning actuators 104 so that the tracks on tape 106 may be closely spaced.

Figure 2A:
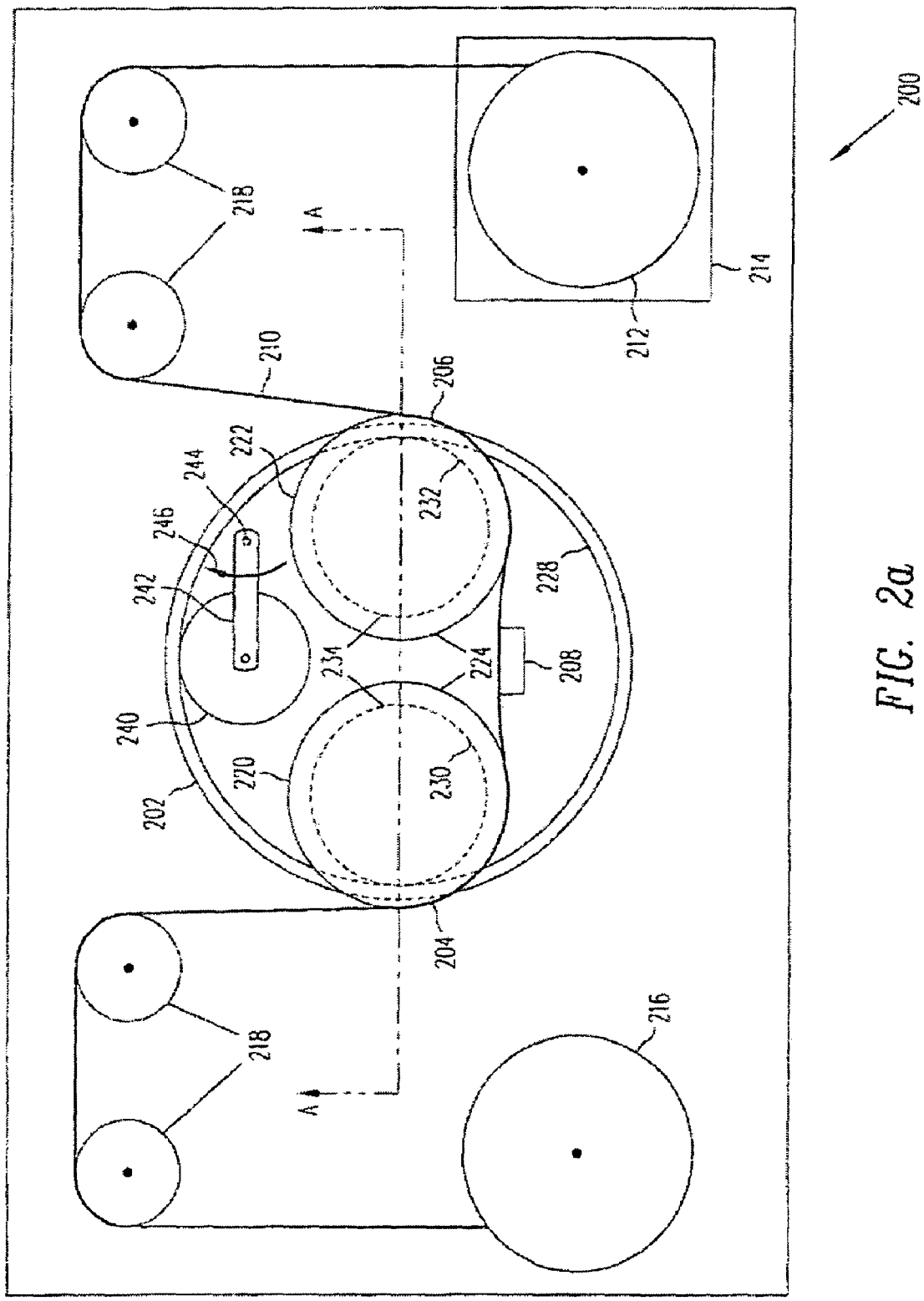
FIG. 2a is a plan view, not to scale, of an embodiment of a tape drive incorporating the present invention.

FIG. 2a illustrates an embodiment of a tape drive system 200 using an idler bearing 202 to synchronize (couple) the rotation of first and second tape roller guides 204 and 206 according to the present invention. Tape roller guides 204 and 206 are disposed on each side of a head assembly 208. A recording tape 210 is guided in a path from a supply reel 212 contained in a tape cassette 214 to a take-up reel 216 by a series of rollers or pins 218 and roller guides 204 and 206 that assist in controlling the position and tension of the tape as it passes over the head assembly 208. The magnetically coated front or recording surface of the tape 210 contacts the head assembly 208. The back or nonrecording surface of the tape 210 engages the outside diameters 220 and 222 of first surfaces 224 of the roller guides 204 and 206 which control the wrap angle of the tape over the head assembly 208. The idler bearing 202 comprises a toroidal or cylindrical ring having an inside diameter surface 228 that engages the outside diameters 230 and 232 of second surfaces 234 of roller guides 204 and 206. A stabilization roller 240 engages the idler bearing 202 at a third point on the inside diameter surface 228. A beam 242 pivoting about a fixed point 244 provides a bias force represented by the arrow 246 against the idler bearing 202. The bias force from the pivot arm both tensions and stabilizes the idler bearing. Alternatively, the stabilization roller 240 may be mounted on a slide (not shown) to provide a linear motion of the stabilization roller to bias it against the idler bearing 202. The bias force may be provided by a spring, solenoid, voice coil, air pressure or any other means known to the art.

FIG. 2b is a cross-section view of the idler bearing 202 and roller guides 204 and 206 through section A-A of FIG. 2a. Tape roller guides 204 and 206 are supported by bearings 250 fitted in base plate 248 and bearing 251 fitted in upper plate 249. Compliant O-rings 252 and 254 held in grooves on second surfaces 234 of roller guides 204 and 206, respectively, engage a groove on the inside diameter surface 228 of the idler bearing 202 to support the idler bearing in position on the second surfaces 234 of the roller guides. Pivot beam 242 has been omitted in FIG. 2b for clarity.

Figure 2C:
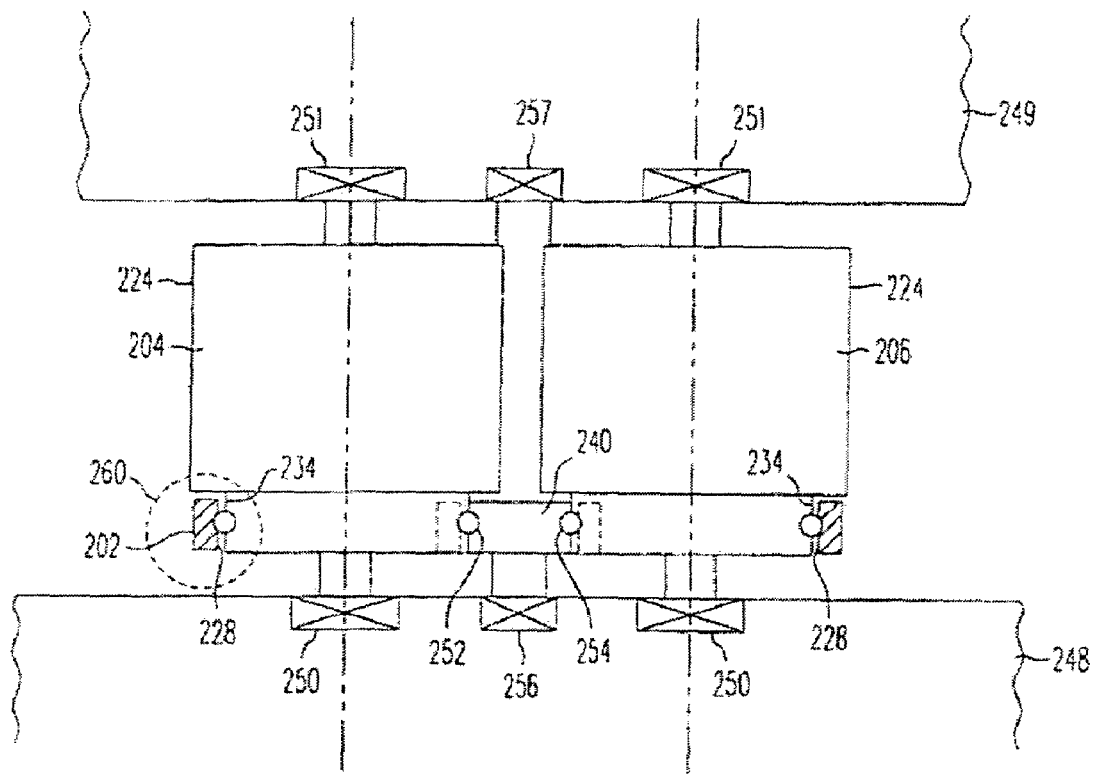
FIG. 2c is an enlarged cross-sectional view, not to scale, of an embodiment of a portion of section A-A of the rollers shown in FIG. 2b.
Figure 2C:
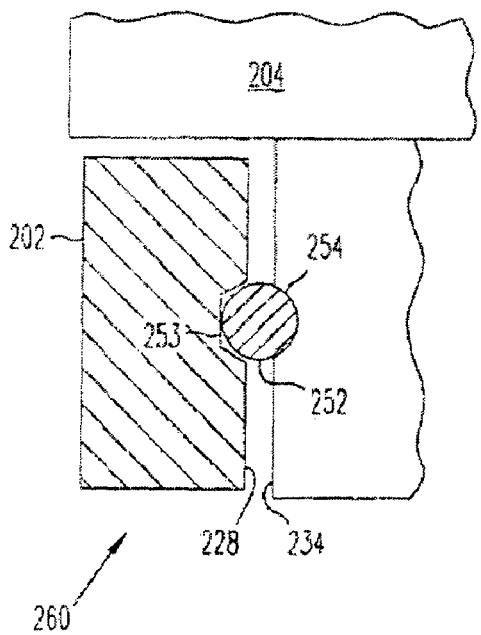
Figure 2D:
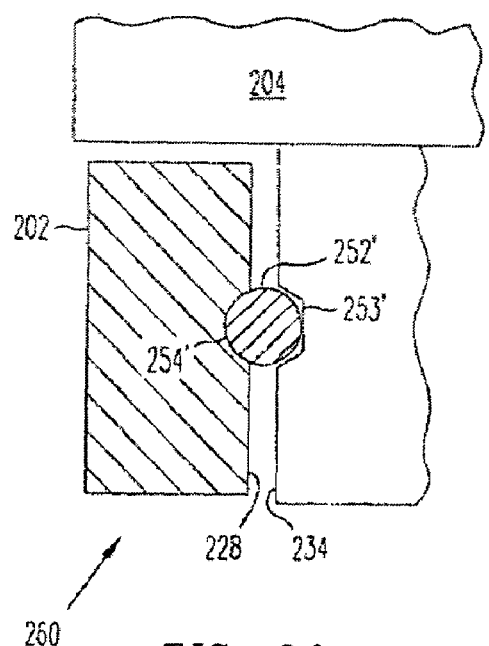
FIG. 2d is an enlarged cross-sectional view, not to scale, of another embodiment of a portion of section A-A of the rollers shown in FIG. 2b.

FIGS. 2c and 2d are enlarged portions of region 260 of the cross-sectional view of FIG. 2b illustrating optional embodiments of the O-ring grooves used to support the idler bearing 202. In the embodiment shown in FIG. 2c, O-ring 252 is fixed in a suitable groove 254 on the second surface 234 of the roller guide 204, preferably by elastic tension of the O-ring encircling the second surface 234. The protruding portion of the O-ring 252 engages in rolling contact groove 253 on the inside diameter surface 228 of the idler bearing 202. Groove 253 is sized and shaped to allow low friction rolling contact with the O-ring 252 while also providing vertical support of the idler bearing 202 and adequate clearance between surfaces 228 and 234. This embodiment of the invention uses three O-rings, one fixed on each of surfaces 234 of roller guides 204 and 206 as illustrated in FIG. 2b and one on the surface of stabilization roller 240 (not shown).

Alternately, in the embodiment shown in FIG. 2d, a single O-ring 252' is fixed in a supporting groove 254' on the inside diameter surface 228 of the idler bearing 202. Grooves 253', sized and shaped for low friction rolling contact are provided on second surfaces 234 of roller guides 204 and 206 and on the surface of stabilization roller 240 (not shown). A disadvantage of the embodiment of FIG. 2d using a single O-ring is that the O-ring must be fixed to the inside surface 228 of the idler bearing so that elastic tension cannot be relied on to fix the O-ring to the surface 228. The O-ring may be adhesively bonded in groove 254' or, alternatively, a groove 254' may be provided having a depth greater than the radius of the O-ring cross-section so that the O-ring is mechanically constrained after insertion into the groove.

The tape 210 moving forward from supply reel 212 to take-up reel 216 or backward from take-up reel to supply reel wraps around roller guides 204 and 206 causing rotation of the guides due to frictional forces at the interface of the tape and the outside diameters 220 and 222 of the first surfaces 224 of the guides. Usually these rollers are grooved to assist the tape in tacking down and not slipping relative to the roller, but often there is some degree of slipping. Fluctuations in the tension of the tape and friction force variations at the surfaces of the guides can also cause the rotational velocity of the guides 204 and 206 to vary relative to one another. The idler bearing 202 provides an additional constraint on the rotational motion of the guides 204 and 206 that couples the rotation of the two rollers and reduces tape path disturbances due to non-synchronous rotation of the roller guides adjacent to the head assembly. The inside diameter surface 228 of the idler bearing 202 engages in rolling contact O-rings 252 and 254 fixed on the outside diameters 230 and 232 of the second surfaces 234 of roller guides 204 and 206, respectively. The relatively high friction at the engagement surfaces ensures that roller guides 204 and 206 turn at the same angular velocity coupled by the angular velocity of the idler bearing 202.

In FIGS. 2a and 2b, the diameters 220 and 222 of first surfaces 224 of the roller guides 204 and 206, respectively, are depicted as being greater than the diameters 230 and 232 of second surfaces 234 of the roller guides. It will be apparent to those skilled in the art that, alternatively, the first surfaces 224 may have smaller or equal diameters to the diameters of second surfaces 234 of the roller guides. An advantage of first surfaces 224 having equal or larger diameters than those of second surfaces 234 is that the span of tape between the rollers 204 and 206 can be made very short improving head-tape interface stability.

FIG. 2a shows the recording tape 210 wound on the supply and take-up reels 212 and 216, respectively, with the magnetically coated front or recording surface of the tape on the inside. Alternatively, the recording tape 210 may be wound on the supply and take-up reels with the recording surface on the outside by simply directing the tape to the opposite sides of the reels and winding the reels in opposite directions to those used for the tape system depicted in FIG. 2a.

Figure 3A:
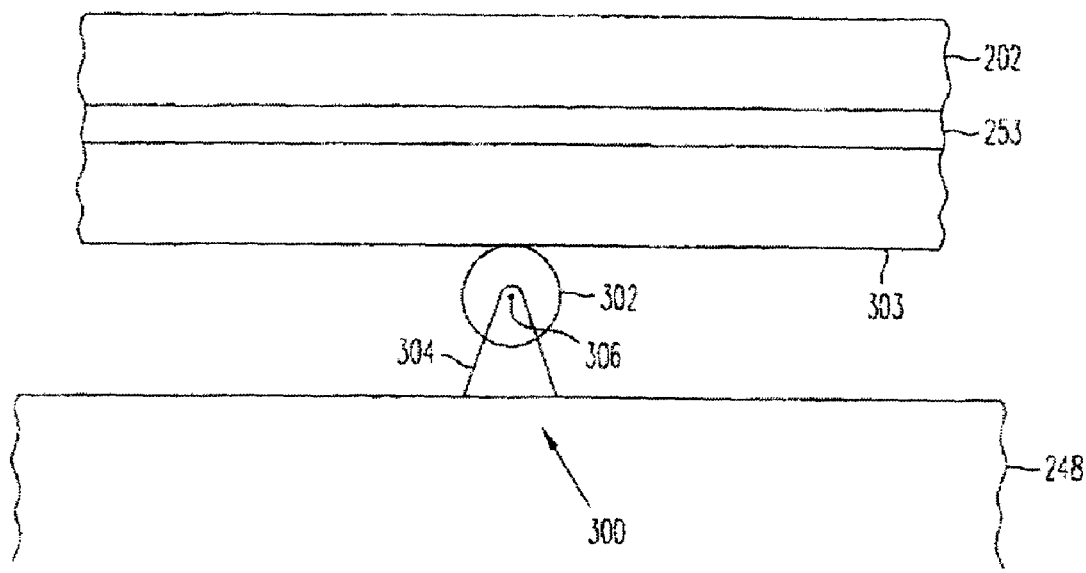
FIG. 3a is a side view, not to scale, illustrating a stabilization guide for the idler bearing of the invention.
Figure 3B:
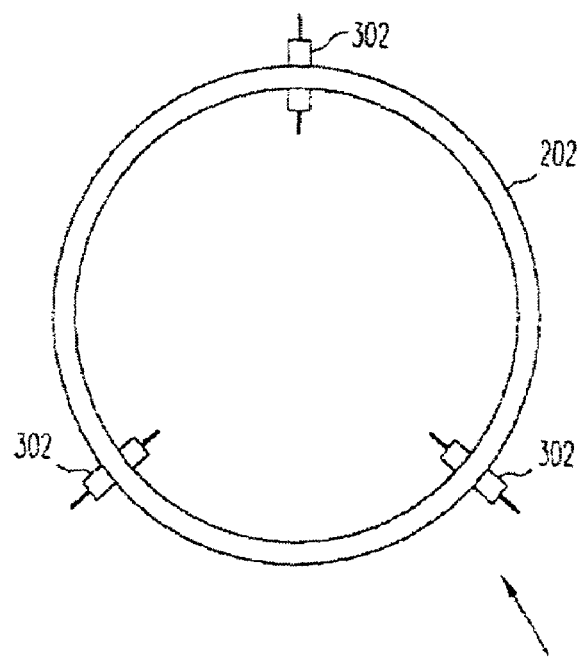
FIG. 3b is a plan view, not to scale, illustrating the stabilization guides for the idler bearing of the invention.

FIGS. 3a and 3b are side and plan views, respectively, of an optional stabilization guide 300 for the idler bearing 202 of the invention. Stabilization guide 300 comprises a roller 302 supported on an axle 306 by a support 304 fixed on the base plate 248. A lower edge 303 of the idler bearing 202 cylindrical ring engages in rolling contact the roller 302. Rollers 302 spaced around the circumference of the idler bearing 202 provide stability and vertical support of the idler bearing 202 as it rotates in contact with first and second tape roller guides 204 and 206 (not shown) to synchronize their rotational velocity.

Figure 4:
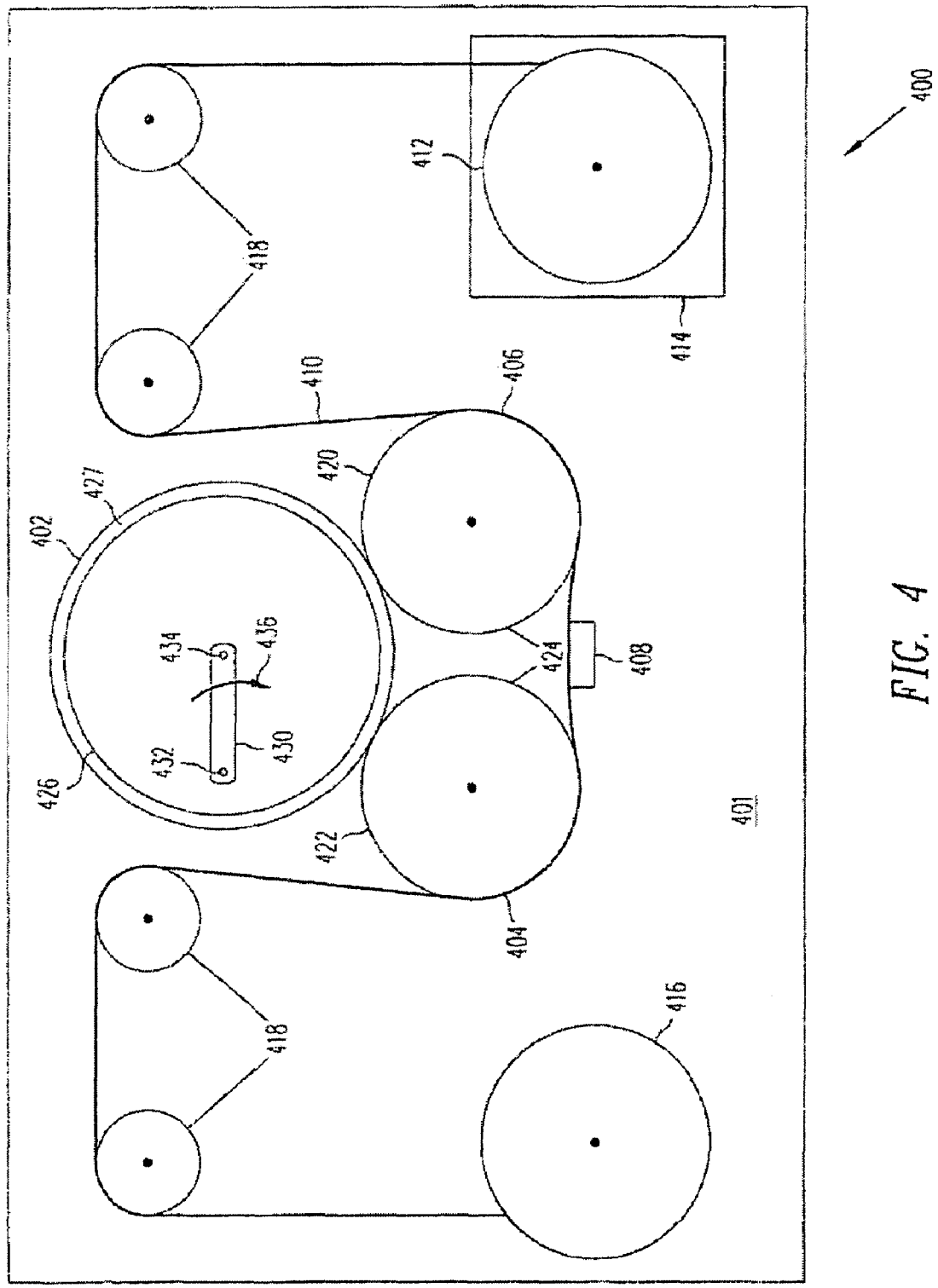
FIG. 4 is a plan view, not to scale, of another embodiment of a tape drive incorporating the present invention.

FIG. 4 illustrates another embodiment of a tape drive system 400 using an idler bearing 402 to synchronize the rotation of first and second tape roller guides 404 and 406 according to the present invention. Tape roller guides 404 and 406 are disposed on each side of a head assembly 408. A recording tape 410 is guided in a path from a supply reel 412 contained in a tape cartridge 414 to a take-up reel 416 by a series of rollers or pins 418 and roller guides 404 and 406 that assist in controlling the position and tension of the tape as it passes over the head assembly 408. The tape 410 engages the outside diameters 420 and 422 of surfaces 424 of the roller guides 404 and 406 which may be used to control the wrap angle of the tape over the head assembly 408. The idler bearing 402 comprises a roller having an outside diameter surface or rim 426 that engages the surfaces 424 of roller guides 404 and 406 on each side of the head. The idler bearing 402 preferably engages portions of the surfaces 424 that do not contact the tape 410, such as at the bottom portion of the roller guides. The idler bearing surface 426 has a coating 427, preferably polyurethane or other compliant material, that increases sliding friction but is thin for low drag and power dissipation. The idler bearing 402 provides an additional constraint on the rotational motion of the guides 404 and 406 that couples the rotation of the two rollers and reduces tape path disturbances due to non-synchronous rotation of the roller guides adjacent to the head assembly. The relatively high friction at the engagement surfaces ensures that roller guides 404 and 406 turn at the same angular velocity coupled by the angular velocity of the idler bearing 402. The idler bearing 402 is rotatable about an axis 434 supported by a beam 430 pivoting about a fixed point 432. The beam 430 provides a bias force represented by the arrow 436 against the roller guides 404 and 406. The bias force may be provided by a spring, solenoid, voice coil, air pressure or other means known to the art.

As described in the present embodiment, roller guides 404 and 406 freely rotate in response to frictional forces induced by the linear motion of the tape 410 engaging surfaces 424 and idler bearing 402 freely rotates due to the frictional forces at the engagement surfaces with roller guides 404 and 406. Alternatively, the idler bearing 402 maybe driven by a motor and the rotation of the roller guides 404 and 406 thus controlled. Therefore, either synchronous motion or forced asynchronous motion of the rollers is possible as desired.

Figure 5:
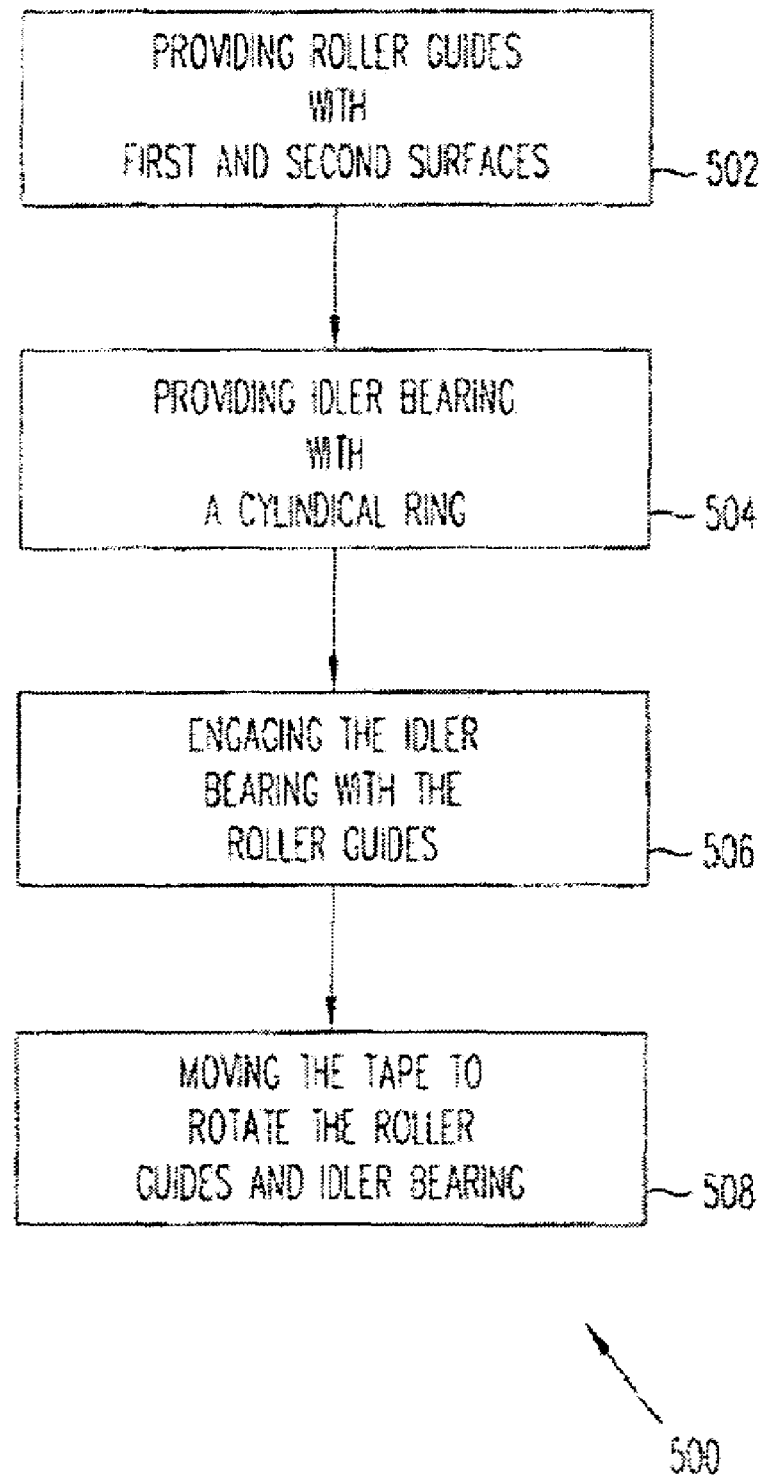
FIG. 5 is a flow chart of a method of coupling the rotations of a pair of roller guides according to the present invention.

FIG. 5 is a flow chart of a method 500 of coupling the rotations of a pair of roller guides disposed one on each side of a head assembly according to the present invention. With reference to FIG. 2a, in step 502, roller guides 204 and 206 disposed one on each side of the head assembly 208 are provided, the roller guides having first cylindrical surfaces 224 engaging a tape and second cylindrical surfaces 234. In step 504, an idler bearing 202 comprising a cylindrical ring 226 having an inside diameter surface 228 is provided for engaging in rolling contact a second cylindrical surface 234 of each of the pair of roller guides. In step 506, the inside diameter surface 228 of the idler bearing cylindrical ring 226 is engaged with the second cylindrical surface 234 of each of the pair of roller guides. In step 508, tape reels 212 and 216 are rotated to move the tape 210 across the head assembly 208 causing rotation of the pair of roller guides 204 and 206 and inducing rotation of the idler bearing 202 due to sliding friction at the engaged surfaces of the idler bearing and the roller guides. The pair of roller guides will rotate with the same angular velocity coupled to the induced angular velocity of the idler bearing.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only as specified in the appended claims.

What is claimed is:

1. A tape recorder system, comprising:
    a head assembly;
    a pair of roller guides disposed one on each side of the head assembly, said roller guides each comprising first and second surfaces, wherein the first surfaces support a tape while the tape is moving across the head assembly; and
    an idler bearing comprising a cylindrical ring having an inside diameter surface, said inside diameter surface engaging in rolling contact the second surfaces of the pair of roller guides.

2. The tape recorder system of claim 1, wherein O-rings positioned in first circumferential grooves formed around the second surfaces of the pair of roller guides engage in rolling contact a second circumferential groove formed around the inside diameter surface of the idler bearing.

3. The tape recorder system of claim 1, wherein first circumferential grooves formed around the second surfaces of the pair of roller guides engage in rolling contact an O-ring fixed in a second circumferential groove formed around the inside diameter surface of the idler bearing.

4. The tape recorder system of claim 1, wherein the diameters of the first surfaces of the roller guides are greater than the diameters of the second surfaces.

5. The tape recorder system of claim 1, wherein the diameters of the first surfaces of the roller guides are equal to or smaller than the diameters of the second surfaces.

6. The tape recorder system of claim 1 further comprising:
    a stabilization roller engaging the inside diameter surface of the idler bearing.

7. The tape recorder system of claim 6, wherein a bias force urges the stabilization roller against the inside diameter surface of the idler bearing.

8. The tape recorder system of claim 6, wherein an O-ring positioned in a third circumferential groove formed around the stabilization roller engages in rolling contact the second circumferential groove formed around the inside diameter surface of the idler bearing.

9. The tape recorder system of claim 6, wherein a third circumferential groove formed around the stabilization roller engages in rolling contact an O-ring fixed in a second circumferential groove formed around the inside diameter surface of the idler bearing.

10. The tape recorder system of claim 1, further comprising:
    at least one stabilization guide, said stabilization guide comprising:
    a roller supported on a base plate of the tape recorder system, said roller engaging in rolling contact a lower edge of the idler bearing cylindrical ring.

11. A tape recorder system, comprising:
    a head assembly;
    a pair of roller guides disposed one on each side of the head assembly, said roller guides each comprising a cylindrical surface for supporting a tape moving across the head assembly; and
    an idler bearing comprising a roller having an outside diameter surface, said outside diameter surface simultaneously engaging in rolling contact the cylindrical surfaces of the roller guides on each side of the head.

12. The tape recorder system of claim 11, wherein the outside diameter surface of the idler bearing is coated with a compliant material.

13. The tape recorder system of claim 11, wherein the outside diameter surface of the idler bearing is coated with polyurethane.

14. The tape recorder system of claim 11, wherein the outside surface diameter of the idler bearing is greater than the diameters of the cylindrical surfaces of the roller guides.

15. The tape recorder system of claim 11, wherein the idler bearing engages portions of the surfaces of the roller guides that do not contact the tape.

16. The tape recorder system of claim 11, wherein a bias force urges the idler bearing against the cylindrical surfaces of the pair of roller guides.

* * * * *